No. 631,185. Patented Aug. 15, 1899.
G. D. SHERWIN.
CANOPY FOR GAS PIPE OR TUBING.
(Application filed Feb. 15, 1899.)
(No Model.)
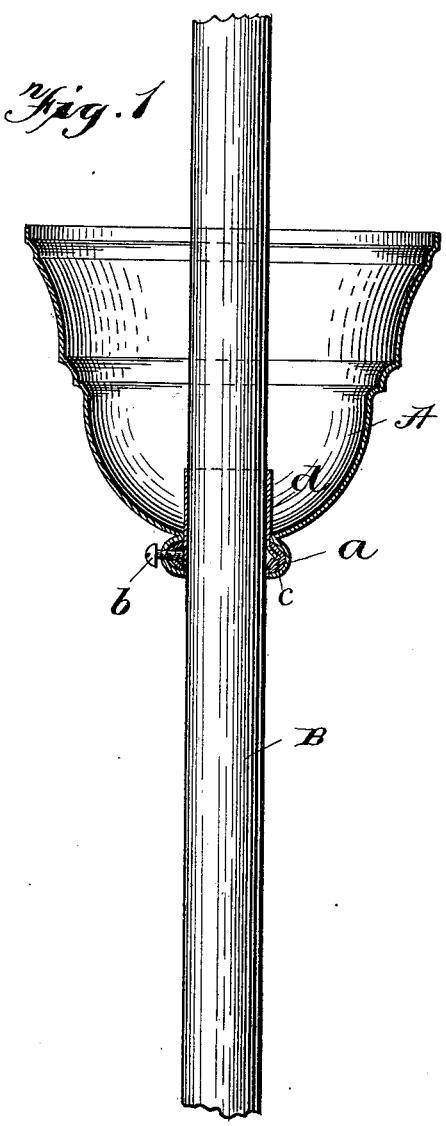
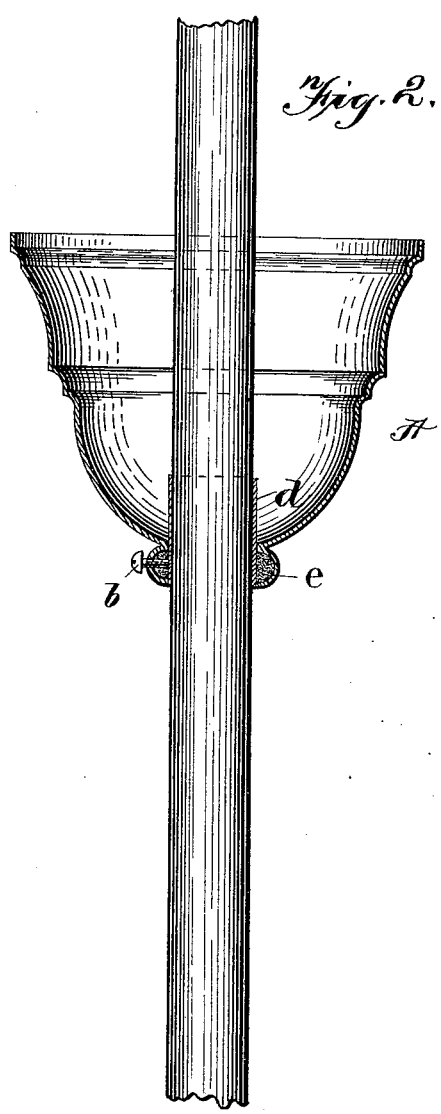

UNITED STATES PATENT OFFICE.

GEORGE D. SHERWIN, OF BURLINGTON, VERMONT.

CANOPY FOR GAS PIPE OR TUBING.

SPECIFICATION forming part of Letters Patent No. 631,185, dated August 15, 1899.

Application filed February 15, 1899. Serial No. 705,551. (No model.)

*To all whom it may concern:*

Be it known that I, GEORGE D. SHERWIN, a citizen of the United States, residing at Burlington, in the county of Chittenden and State of Vermont, have invented certain new and useful Improvements in Canopies for Electric-Light or Gas Pipe or Tubing; and I do hereby declare the following to be a full, clear, and exact description of the invention, such as will enable others skilled in the art to which it appertains to make and use the same.

My invention relates to improvements in canopies for electric-light or gas pipe or tubing, all of which will be fully described hereinafter and particularly pointed out in the claims.

In the use of canopies of the character heretofore used plaster and dust accumulate between the socket of the canopy and the pipe, which makes it difficult to move the canopy up and down upon the pipe, and when moved the pipe is scratched and marred on account of the accumulation of plaster and dust between the socket of the canopy and the pipe.

The object of my present invention is to overcome these difficulties by providing the socket of the canopy with an upwardly-projecting short shield in the form of a tube carried by the socket and surrounding the pipe, whereby all falling plaster from the ceiling and accumulated dust is kept out of contact with the pipe and kept from getting between the socket of the canopy and the pipe, said tube being of a material softer than the metal canopy and metal pipe, whereby the shield can be moved up and down upon the pipe with perfect ease and without marring or scratching the pipe.

In the accompanying drawings, Figure 1 is a longitudinal sectional view of a canopy embodying my invention, showing it in position upon the pipe. Fig. 2 is a similar view showing a modification in the manner of securing the tube within the socket.

Referring now to the drawings, A indicates a canopy in the shape of a hollow truncated cone having a socket $a$ at its lower end, through which the gas or electric-light pipe B passes. Carried by this socket is an upwardly-projecting short tubular shield $d$, formed of paper or other material which is softer than the metallic canopy and pipe, and passing through the socket is a clamping-screw $b$.

In Fig. 1 I show the tubular shield fastened to the canopy-socket by providing the socket with an annular groove containing glue $c$ and turning the paper shield therein as illustrated.

In Fig. 2 the shield is secured within the socket by glue $e$ or other adhesive material placed in said groove.

By providing a canopy with an upwardly-projecting short soft tube, as herein shown and described, all accumulation of plaster and dust is kept from between the canopy-socket and the pipe, whereby the canopy can be easily moved up or down upon the pipe without in any manner scratching, injuring, or marring the appearance of the pipe. The tube also provides a protection against injury to the pipe from the inner end of the clamping-screw in that it is situated between the clamping-screw and the pipe, thus preventing injury to the pipe from the clamping-screw, as is usually the case.

Having thus described my invention, what I claim, and desire to secure by Letters Patent, is—

1. A canopy for electric or gas pipe or tubing comprising a body portion as A having a socket at its lower end for the tubing, said socket provided with a tube projecting upward above the bottom of the body and adapted to embrace the gas or other pipe and to form a pocket between the upwardly-extending tube and the bottom of the body and to prevent the passage of dirt or falling particles from the ceiling between the socket and pipe, substantially as described.

2. A metallic canopy comprising a truncated cone, the apex of the cone having a socket adapted to embrace a gas pipe or tube, the socket provided with a soft tube extending upwardly above the bottom of the truncated cone and forming a pocket between it and the bottom of the cone for the reception of dirt, dust and falling particles from the ceiling and preventing their egress between the socket and the gas-pipe, substantially as described.

3. A canopy comprising a metallic truncated cone having a socket at its lower end to receive a gas-pipe, the said socket having an outwardly-extending annular groove, and a tube extending upward above the bottom of the cone, said tube formed of paper or similar material and expanded outwardly within the said groove, substantially as described.

In testimony whereof I have hereunto set my hand in the presence of two subscribing witnesses.

GEORGE D. SHERWIN.

Witnesses:
 MYRON G. NORTON,
 FREDERICK A. WHEELER.